Patented Sept. 23, 1924.

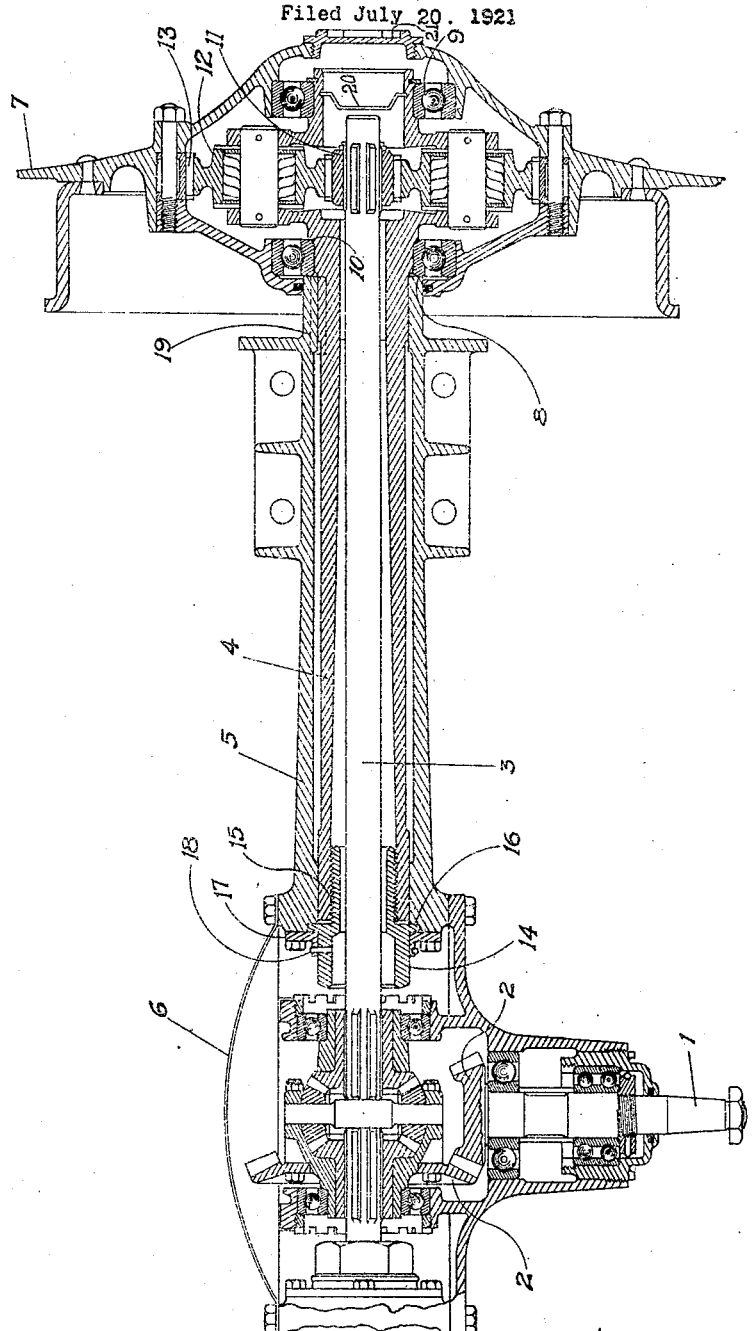

1,509,250

UNITED STATES PATENT OFFICE.

LEO B. MILLER AND ARTHUR J. SHRUM, OF CHICAGO, ILLINOIS.

AXLE CONSTRUCTION.

Application filed July 20, 1921. Serial No. 486,090.

*To all whom it may concern:*

Be it known that we, LEO B. MILLER and ARTHUR J. SHRUM, citizens of the United States, residing at Chicago, in the county of Cook and State of Illinois, have invented certain new and useful Improvements in Axle Constructions, of which the following is a specification.

Our invention relates to improvements in axle construction, and more particularly to an automobile axle of the type in which there is a reduction gearing in the wheel itself.

In structures of this type, as made heretofore, the wheel is mounted on a tubular member, called a stub axle, which, in turn, is surrounded by an outer tubular member known as the axle housing. Power is transmitted from the differential by means of a small drive shaft, on the end of which is a pinion meshing with gears carried in the wheel itself. In order to clamp the housing to the stub shaft it has been necessary heretofore to provide a slit housing having clamping bolts whereby it might be clamped about the stub shaft. To prevent relative longitudinal movement of the housing and the stub axle, it has been the practice to insert a locating bolt or key transversely through the housing, engaging a seat in the stub axle, to lock the parts together. Relative rotation has been prevented by a spline or key. The wheel turns on ball bearing raceways mounted on the stub axle. It has been found difficult heretofore with the construction described to mount the inner raceway in such manner as to prevent side play and creeping thereof, as a result of which the seat for the raceway wears away in time, necessitating expensive repairs.

It is one object of the present invention to overcome this difficulty by providing means for clamping the raceway firmly in place, thereby preventing this wear.

Another object of the invention is to provide a construction which facilitates removal of the stub axle and wheel.

A further object is to provide an axle construction of increased strength with less weight.

Other objects of the invention are to provide a generally improved device of this character.

In the accompanying drawing we have illustrated one embodiment of the invention, in which a differential and longitudinal drive shaft are connected to the engine. Our improvement is also adapted to a construction in which an electric motor is mounted in the axle housing.

The bevel pinion drive shaft 1 is shown connecting with the differential gearing 2—2 of any suitable type. From the differential gearing, power is transmitted through one of two drive shafts 3, each located within a stub axle 4, the latter being encased in a housing 5. Access to the differential gearing and the inner end of the drive shaft may be had through the removable plate 6 constituting part of the differential housing. The wheel is illustrated in part at 7, and is provided with ball bearing raceways 8, 9 mounted on the stub axle 4.

The inner raceway 8 is confined between a shoulder 10 on said stub axle and the outer end of the housing. The outer end of the drive shaft has a pinion 11 thereon meshing with idler gears 12 which, in turn, mesh with an annular gear 13 carried by the wheel, thereby rotating said wheel. The adjustment of the stub axle 4 within the housing 5, for the purpose of clamping the inner raceway in position, is effected by a nut 14, the inner screw-threaded end of which engages a correspondingly screw-threaded portion 15 at the inner end of the stub axle. The nut is permitted to turn, but is held against longitudinal movement by means of an integral flange 16, which is confined between a ring 17, bolted to the inner end of the housing, and a seat in the housing. Said nut is locked against rotation by a wire locking ring 18.

With the arrangement described it will be seen that in assembling the structure the stub shaft 4 is slipped into the housing 5 far enough to ensure engagement of its screw-threaded end with the nut, after which the nut is rotated, access thereto being had through the differential housing, the plate 6 of which is removed for the purpose. Rotation of the nut draws the stub shaft into its housing until the cylindrical bearing surfaces at each end form a tight fit with their seats and until the raceway 8 is firmly clamped in place. The ends of said stub shaft have a press fit within the adjacent ends of the housing, and the diameter of the annular seat at the outer end of said housing is somewhat greater than at the inner end to enable the stub shaft to be slipped readily into said housing. To prevent relative rotation of the stub axle and housing a suitable key 19 is provided which fits within the slots at the outer end of the stub axle and housing.

The drive shaft 3 is thereafter assembled by inserting it through the opening in the center of the wheel and through the hollow nut 14 until its inner end engages one of bevel gear hubs in the usual manner. After the drive shaft has been positioned, a retaining spring 20 is put in place, comprising a longitudinal plate received within suitable slots, and the opening through the wheel is concealed by a hub cap 21. In removing the stub axle the reverse operations are followed, the drive shaft being first pulled out, after which rotation of the nut 14 forces the stub shaft out sufficiently to disengage the bearing surfaces at each end thereof, the length of said surfaces being less than the length of the screw-threaded portion of said nut. This method of removal is a considerable improvement over the prior practice, as with the split housing previously employed the housing and the stub axle would rust, making removal thereof very difficult.

In the present construction the parts are forcibly separated, being normally such a tight fit that no key is needed to lock them against relative rotation, although a key is preferably provided as a precaution. Furthermore, the stub shaft extends inwardly practically the full length of the housing, thereby reinforcing the latter and providing a very strong construction, particularly as the housing is an integral member, instead of being slotted. For this reason a stronger construction is possible with less weight. Various other changes will be apparent. The construction is also adapted for use in tractors, mine locomotives, industrial trucks, railway equipment, and other classes of service.

We claim:—

1. In a device of the class described, a housing, a stub axle within the same and projecting from the end thereof, a drive shaft within said stub axle, an anti-friction raceway on said stub axle, a wheel mounted on said raceway, means for driving said wheel from said driving shaft, and means adjacent one end of said stub axle for holding and adjusting the same in either longitudinal direction within said housing.

2. In a device of the class described, a housing, a stub axle having a press fit therein at each end thereof, and means removably secured to said housing for drawing said axle thereinto to a predetermined position.

3. In a device of the class described, a housing, a stub axle fitting therein, and a nut rotatably secured at one end of said housing for drawing said stub axle to a predetermined position within said housing.

4. In combination, a housing, a cylindrical axle fitting therein, a collar at one end of said housing, a nut confined between said axle and housing and having screw-threaded engagement with said cylindrical member to move the latter longitudinally and hold it in predetermined position, and means for locking said housing and member against relative rotation.

5. In combination, a housing having a cylindrical seat at each end, a recess in one of said seats, a hollow nut having a flange received within said recess, a collar secured to said housing for locking said flange in place, a tubular member having a bearing surface at each end which surfaces fit within said first-mentioned cylindrical seats, a keyway in one of the cylindrical surfaces of said housing, a corresponding keyway in said tubular member, a key fitting said keyways to prevent rotation of said members, said nut having a screw-threaded extension engaging within said tubular member to move the latter longitudinally, and a drive shaft passing through said hollow nut and tubular member.

6. In combination, a differential, a drive shaft extending from one side thereof, a stub shaft surrounding said drive shaft, a housing for said differential, a housing for said stub axle connected with said first housing, and means accessible through said differential housing for adjusting said stub axle in either longitudinal direction within its housing.

7. In combination, an axle housing having a cylindrical inner seat at each end thereof, a stub shaft therein fitting said seats closely, a screw-threaded part carried by one of said members and engaging the other to effect a relative longitudinal adjustment, the diameter of the seat at the outer end of said housing exceeding the diameter of the seat at the inner end thereof, said seats being of less length than the maximum longitudinal adjustment, thereby facilitating assembly and removal of said members.

8. An axle construction comprising a differential housing having axle housings projecting from opposite sides thereof, tubular stub axles which fit within said axle housings and extend from the inner ends thereof beyond the outer ends, and means accessible from said differential housing for adjusting said stub axles outwardly or inwardly relatively to said axle housings.

In testimony whereof, we have subscribed our names.

LEO B. MILLER.
ARTHUR J. SHRUM.